US007355982B2

(12) United States Patent
Abe (10) Patent No.: US 7,355,982 B2
(45) Date of Patent: Apr. 8, 2008

(54) SUBSCRIBER LINE TERMINAL DEVICE AND LOOPBACK TEST METHOD

(75) Inventor: Hideji Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1079 days.

(21) Appl. No.: 10/308,421

(22) Filed: Dec. 3, 2002

(65) Prior Publication Data

US 2004/0017965 A1   Jan. 29, 2004

(30) Foreign Application Priority Data

Jul. 29, 2002   (JP)   ............................. 2002-220296

(51) Int. Cl.
  *H04J 3/14*   (2006.01)
  *H04L 12/26*   (2006.01)
  *H04B 10/08*   (2006.01)
  *H04B 17/00*   (2006.01)
(52) U.S. Cl. ..................... 370/241.1; 370/245; 398/16; 398/17
(58) Field of Classification Search ............. 370/241.1, 370/245; 398/16, 17
  See application file for complete search history.

(56) References Cited

U.S. PATENT DOCUMENTS

| | | | | |
|---|---|---|---|---|
| 4,816,208 A | * | 3/1989 | Woods et al. | ................ 376/259 |
| 5,572,679 A | * | 11/1996 | Ishizaka et al. | ............. 709/227 |
| 5,917,898 A | * | 6/1999 | Bassa et al. | ................. 379/133 |
| 6,154,859 A | * | 11/2000 | Norizuki et al. | ............... 714/47 |
| 6,359,557 B2 | * | 3/2002 | Bilder | ......................... 340/531 |
| 6,665,267 B1 | * | 12/2003 | Iwasaki et al. | .............. 370/241 |
| 6,934,894 B2 | * | 8/2005 | Akiyama | ..................... 714/712 |
| 2002/0021472 A1 | * | 2/2002 | Nakaishi | ..................... 359/168 |

FOREIGN PATENT DOCUMENTS

| | | |
|---|---|---|
| JP | 64-078538 | 3/1989 |
| JP | 09-036859 | 2/1997 |
| JP | 2002-94541 | 3/2002 |

OTHER PUBLICATIONS (One page) Japanese Office Action dated Nov. 20, 2007, for the corresponding Japanese Patent Application JP 2002-220296.
Notification of Reason for Reason for Rejection dated Nov. 20, 2007, for corresponding Japanese Patent Application JP 2002-220296.

* cited by examiner

*Primary Examiner*—Alpus H. Hsu
(74) *Attorney, Agent, or Firm*—Katten Muchin Rosenman LLP

(57) ABSTRACT

The present invention provides a subscriber line terminal device, which enables identification of the cause of abnormality when abnormality is detected in remote monitoring of a subscriber line terminating device connected to the terminal device via an optical fiber. The terminal device receives a plurality of monitoring signals sent from the terminating device via the optical fiber, the plurality of monitoring signals indicating normality or abnormality of a plurality of monitored items in the terminating device respectively. When two or more among the plurality of monitoring signals indicates abnormality, the terminal device selects a monitoring signal with high order of priority from among the two or more monitoring signals indicating abnormality, based on a prescribed order of priority.

6 Claims, 10 Drawing Sheets

●:DETECTION, ◎:TRANSFER, ×:BREAK

FIG. 3B

| | CONTROL SIGNAL | CONTENT |
|---|---|---|
| 1 | LOOP-MCQ | LOOPBACK TEST INITIATION REQUEST /CANCELLATION REQUEST |

FIG. 3C

| | MONITORING SIGNAL | CONTENT |
|---|---|---|
| 1 | LOOP-MCS | LOOPBACK TEST INITIATION RESPONSE /CANCELLATION RESPONSE |
| 2 | RMT-EQP | DEVICE MALFUNCTION OCCURRENCE /RECOVERY |
| 3 | RMT-POWER | POWER SUPPLLY CUTOFF OCCURRENCE /RECOVERY |
| 4 | RMT-TX-LINK | UTP LINK BREAK OCCURRENCE /RECOVERY |
| 5 | RMT-FX-LINK | ABNORMALITY OF RECEPTION OF OPTICAL SIGNAL OCCURRENCE /RECOVERY |

FIG. 3D

| | ALARM | CONTENT |
|---|---|---|
| 1 | DOWNLINK | IN-STATION MC OPTICAL LINK BREAK |
| 2 | UPLINK | IN-STATION MC UTP LINK BREAK |
| 3 | EQP | IN-STATION DEVICE ERROR |

FIG. 3E

| | ALARM | CONTENT |
|---|---|---|
| 1 | TXLINK | UTP LINK BREAK |
| 2 | FXLINK | ABNORMALITY OF RECEPTION OF OPTICAL SIGNAL |

| F0 | F4 | C0 | C4 | S0 | S4 | S8  | E0 |
|----|----|----|----|----|----|-----|----|
| F1 | F5 | C1 | C5 | S1 | S5 | S9  | E1 |
| F2 | F6 | C2 | C6 | S2 | S6 | S10 | E2 |
| F3 | F7 | C3 | C7 | S3 | S7 | S11 | E3 |

FIG. 5B

| BIT | MONITORING SIGNAL /CONTROL SIGNAL | CONTENT | REMARKS |
|---|---|---|---|
| F0~F7 | PREAMBLE | 10101010 | FIXED |
| C0 | OAM SIGNAL IDENTIFIER | 0 | FIXED |
| C1 | DIRECTION IDENTIFIER | 0: UP, 1: DOWN | |
| C2 | COMMAND IDENTIFIER | 0: COMMAND<br>1: RESPONSE | |
| C3,C4 | VERSION | 00 | FIXED |
| C5,C6 | LENGTH | 00 | FIXED |
| C7 | RESERVE | 0 | FIXED |
| S0 | LOOP-MCQ/LOOP-MCS | 0: LOOP CANCEL<br>1: LOOP EXECUTE | |
| S1 | RMT-POWER | 0: NORMAL<br>1: POWER SUPPLY CUTOFF | |
| S2 | RMT-FX-LINK | 0: LINKUP, 1: LINKDOWN | |
| S3 | RMT-TX-LINK | 0: LINKUP, 1: LINKDOWN | |
| S4 | RMT-EQP | 0: NORMAL, 1: ABNORMAL | |
| S5~S11 | RESERVE | 0 | |
| E0~E3 | END IDENTIFIER | 1010 | FIXED |

SUBSCRIBER LINE TERMINAL DEVICE AND LOOPBACK TEST METHOD

BACKGROUND OF THE INVENTION

1. Field of the Invention

The present invention relates to a subscriber line terminal device connected to a subscriber line terminating device by an optical fiber, and in particular to a subscriber line terminal device, which selects a subscriber line terminal device monitoring signal or subscriber line terminating device alarm signal on the basis of order of priority, as well as to a subscriber line terminal device enabling a loopback test which includes a logical layer of the subscriber line terminal device.

Also, the present invention relates to a loopback test method for a subscriber line terminal device connected to a subscriber line terminating device by an optical fiber, and in particular to a loopback test method capable of a test including a logical layer of the subscriber line terminal device.

2. Description of the Related Art

Subscriber-based optical communication systems such as "Fiber to the Home" (FTTH), in which optical fiber is laid to a subscriber's home, are beginning to be adopted on a large scale.

Figure 1A:
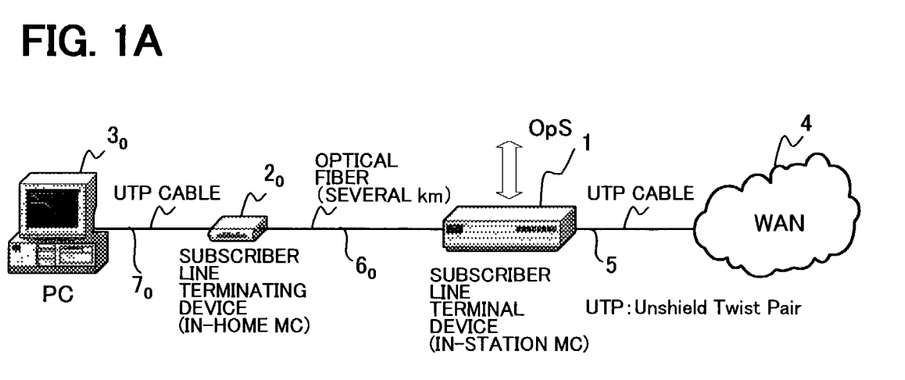
FIG. 1A and FIG. 1B are block diagrams of the overall configurations of subscriber-based optical communication systems having subscriber line terminal devices and subscriber line terminating devices.
Figure 1B:
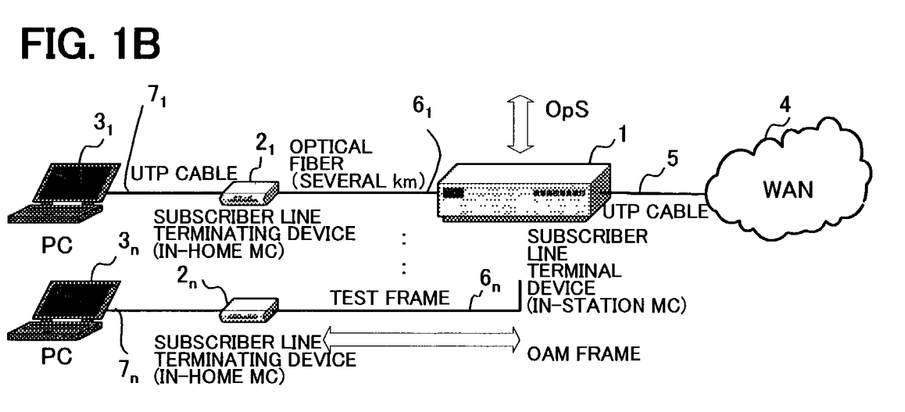

FIG. 1A and FIG. 1B are block diagrams of the overall configurations of subscriber-based optical communication systems having subscriber line terminal devices (in-station media converter; hereafter called "in-station MC") and subscriber line terminating devices (in-home media converter; hereafter called "in-home MC"). FIG. 1A shows an example in which one in-home MC $2_0$ is connected to one in-station MC 1, and FIG. 1B shows an example in which, in order to increase user capacity, a plurality of in-home MCs $2_1$ to $2_n$ (where n is an integer greater than or equal to 2) are connected to one in-station MC 1.

The in-station MC 1 is installed in a central station, and the in-home MCs $2_0$, $2_1$ to $2_n$ (hereafter, except when there is a special need to make distinctions, referred to generally as "in-home MCs 2") are installed in user homes.

One of the ports of the in-station MC 1 and one of the ports of in-home MCs 2 are connected by means of single-mode optical fibers $6_0$, $6_1$ to $6_n$ (hereafter, except when there is a special need to make distinctions, referred to generally as "optical fibers 6"). In the optical fibers 6, light of different wavelengths is allocated to downstream signals from the in-station MC 1 to in-home MCs 2, and to upstream signals from in-home MCs 2 to the in-station MC 1, to perform full-duplex bidirectional communication between MCs. For example, the wavelength 1.55 µm is allocated to downstream signals, and the wavelength 1.3 µm is allocated to upstream signals. By this means, point-to-point communication service is provided.

The other port of the in-station MC 1 is connected via a UTP (unshielded twisted pair) cable 5 to a WAN (wide-area network) 4. The other ports of the in-home MCs 2 are connected, via UTP cables $7_0$, $7_1$ to $7_n$ (hereafter, except when there is a special need to make distinctions, referred to generally as "UTP cables 7") to personal computers $3_0$, $3_1$ to $3_n$ (hereafter, except when there is a special need to make distinctions, referred to generally as "PCs 3") as examples of user terminals. By this means, data from the WAN 4 is transmitted to the PCs 3 via the in-station MC 1 and in-home MCs 2, and data from PCs 3 is transmitted to the WAN 4 via the in-home MCs 2 and in-station MC 1.

An optical ether access method is adopted between the in-station MC 1 and in-home MCs 2, and data signals (user data) is transmitted through media access control (MAC) frames conforming to the IEEE 802.3 standard.

On the other hand, the in-station MC 1 has an interface device which provides an interface with an operation system (OpS) terminal (not shown) for monitoring and control, and is connected to the OpS terminal via this interface device. The OpS terminal performs remote monitoring and remote control of in-home MCs 2 via the in-station MC 1. In order to perform the remote monitoring and remote control, control signals are transmitted from the in-station MC 1 to the in-home MCs 2, and monitoring signals are transmitted from the in-home MCs 2 to the in-station MC 1.

The control signals and monitoring signals are transmitted using specially defined frames (hereafter called "OAM (operation, administration and maintenance) frames").

Figure 3A:
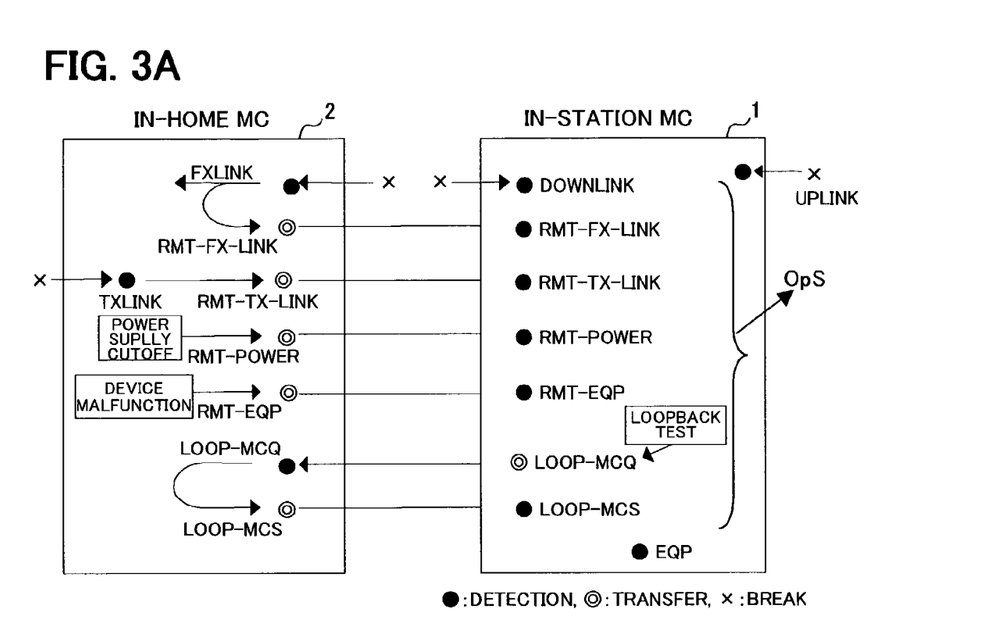
FIG. 3A shows an appearance of control signals and monitoring signals.
Figure 3B:
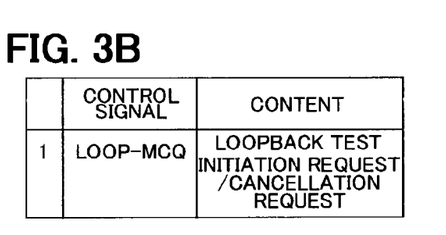
FIG. 3B shows details of a control signal.
Figure 3C:
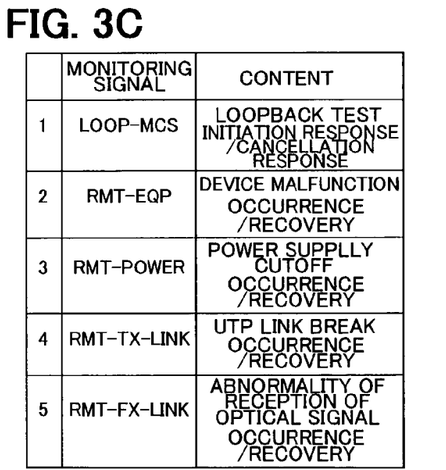
FIG. 3C shows details of monitoring signals.

Control signals include "LOOP-MCQ" signals, as shown in FIGS. 3A and 3B, which request the initiation and cancellation of loopback tests (described below). Monitoring signals include "LOOP-MCS", "RMT-POWER", "RMT-FX-LINK", "RMT-TX-LINK", and "RMT-EQP" signals, as shown in FIGS. 3A and 3C.

The monitoring signal LOOP-MCS is a signal returned from an in-home MC 2 to the in-station MC 1 as the acknowledgement (initiation response or cancellation response) to the control signal LOOP-MCQ. The monitoring signal RMT-POWER is a signal indicating the state of power (normal/abnormal) of the in-home MC 2. The monitoring signal RMT-TX-LINK is a signal indicating the state of the UTP cable 7. The monitoring signal RMT-FX-LINK is a signal indicating the state of reception of optical signals of the optical fiber 6. The monitoring signal RMT-EQP is a signal indicating the state of the in-home MC 2. In the following, the monitoring signals that indicate the occurrences of abnormality may be called alarm signals.

These monitoring signals (alarm signals) are sent from in-home MCs 2 to the in-station MC 1, and from the in-station MC 1 to the OpS as the alarm sginals.

Figure 3D:
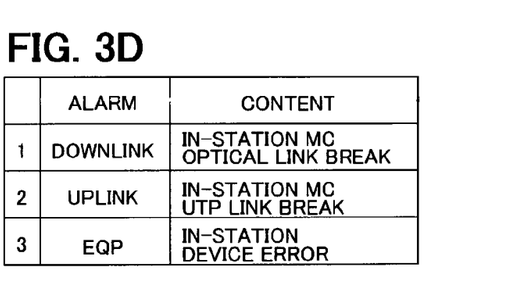
FIG. 3D shows details of alarm signals detected by the in-station MC.

On the other hand, the in-station MC 1 monitors its own state, and when an abnormality is detected, sends an alarm signal to the OpS. As shown in FIG. 3D, there are signals "UPLINK", indicating a link break in the UTP cable 5; "DOWNLINK", indicating an optical link break in the in-station MC 1; and "EQP", indicating equipment malfunction (memory error or similar) in the in-station MC 1.

Figure 3E:
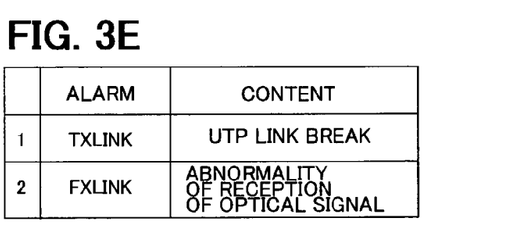
FIG. 3E shows details of alarms signals detected by the in-home MC.

As shown in FIG. 3E, alarms detected by the in-home MC 2 include "TXLINK", indicating a link break in the UTP cable 7, and "FXLINK", indicating an abnormality in reception of optical signals of the optical fiber 6.

Figure 2:
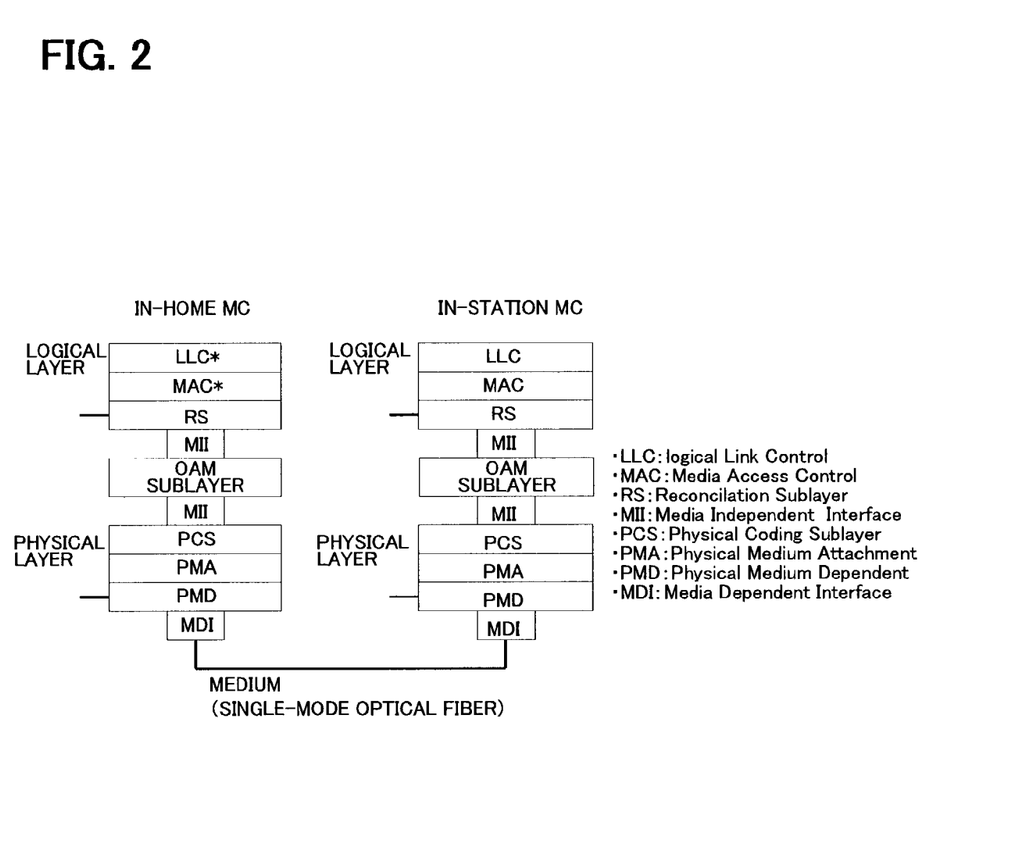
FIG. 2 is a block diagram showing a logical hierarchy model of the in-station MC and in-home MC.
Figure 13:
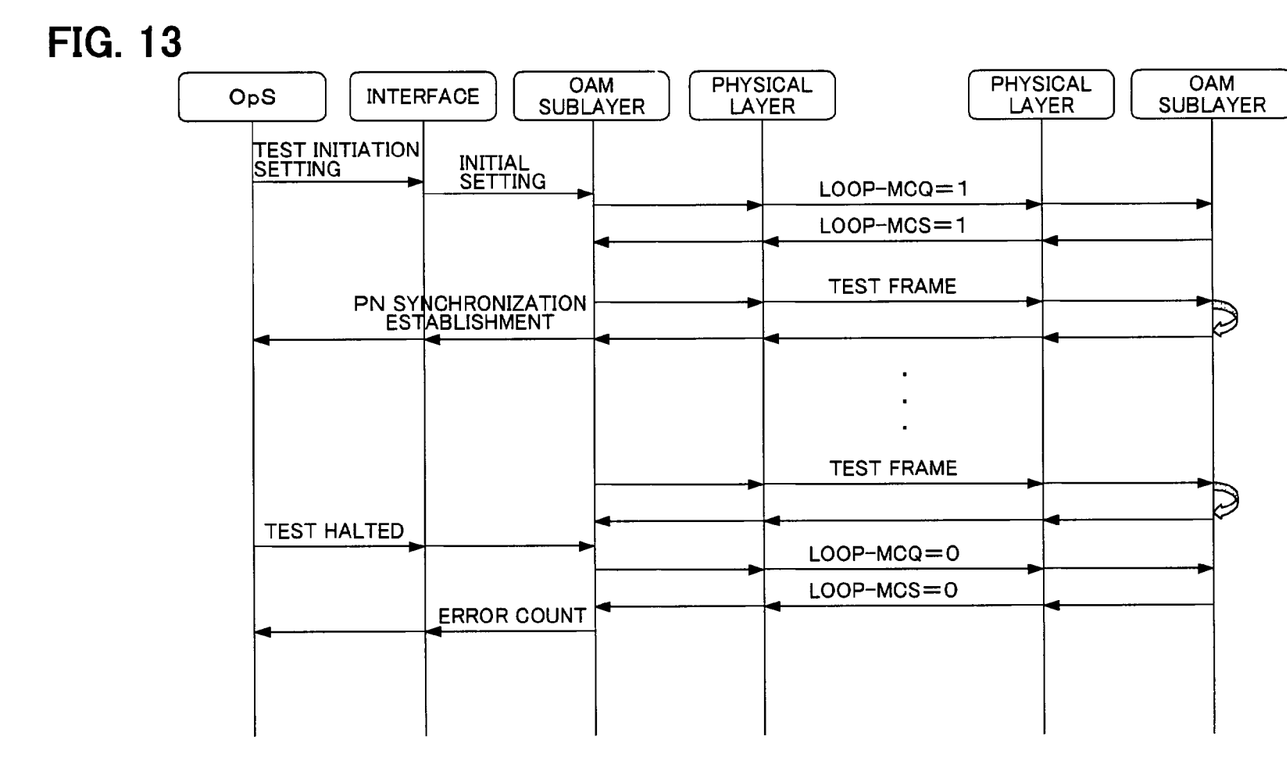
FIG. 13 is a sequence diagram of conventional loopback tests.

Loopback tests are executed between the in-station MC 1 and in-home MCs 2, in order to confirm normality of the transmission line prior to the initiation of service when a new in-home MC 2 is to be installed in a user home, or in order to single out (narrow down) the fault point when a fault occurs. FIG. 13 is a sequence diagram of conventional loopback tests; FIG. 2 is a block diagram showing a logical hierarchy model of the in-station MC 1 and in-home MCs 2.

The in-station MC 1 has, as the logical hierarchy model, a physical layer (OSI layer 1) and logical layer (MAC layer (lower sublayer of OSI layer 2). An OAM sublayer for maintenance is provided in the physical layer. The logical layer is provided, in particular, in modes in which a plurality of in-home MCs 2 are connected to a single in-station MC 1.

A device to execute the processing of each of these layers is provided separately. For example, the PHY chip, which is an integrated circuit device, is a device which executes the processing of the physical layer excluding the OAM sublayer; the device which executes the processing of the sublayer comprises an ASIC (for example, FPGA), and the device which executes the processing of the logical layer comprises an MAC chip, which is an integrated circuit device.

Similarly, an in-home MC 2 has, for example, a PHY chip, which executes physical layer processing, an FPGA which executes OAM layer processing, and a MAC chip which executes logical layer processing. In some cases the in-home MC 2 does not have a logical layer; in such cases, the MAC chip may be omitted.

Figure 14:
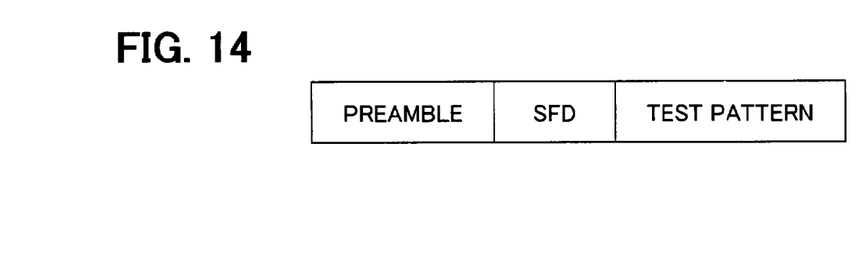
FIG. 14 shows the frame format of a conventional test frame.

In the loopback test, first a loopback test initiation event is sent from the OpS terminal to the OAM sublayer via the interface device of the in-station MC 1. When the OAM sublayer of the in-station MC 1 receives the loopback test initiation event, the loopback test initiation request (LOOP-MCQ=1) shown in FIG. 3B is sent to the in-home MC 2 using an OAM frame. When the in-home MC 2 receives this request, it forms a loop path within its own data signal transmission pathway, and then sends the loopback test initiation response (LOOP-MCS=1) shown in FIG. 3C to the in-station MC 1 using an OAM frame. Then, a test frame in the format shown in FIG. 14 is transmitted and received continuously a plurality of times at a prescribed transmission period (interval) between the in-station MC 1 and in-home MC 2.

The test frame has a preamble, SFD (Start of Frame Delimiter), and test pattern. The test pattern is a PN pattern generated by a pseudo-noise (PN) generator (not shown) in the OAM sublayer (for example, $PN15=X^{15}+X^2+1$).

A test frame received by an in-home MC 2 is supplied to the OAM sublayer of the physical layer, and is then returned to the in-station MC 1.

The OAM sublayer of the in-station MC 1 checks the test pattern of the test frame returned from the in-home MC 2, and counts the number of error bits.

Transmission and reception of such test frames is repeated during a prescribed time period (time set by a timer), and when the OpS gives notification of the end of the test, the loopback test is ended. As a result of the test end, a loopback test cancellation request (LOOP-MCQ=0) shown in FIG. 3B is sent from the in-station MC 1 to the in-home MC 2 using an OAM frame, and a loopback test cancellation response (LOOP-MCS=0) shown in FIG. 3C is sent from the in-home MC 2 to the in-station MC 1 using an OAM frame.

As the test results, the in-station MC 1 notifies the OpS as to whether the PN synchronization was established and to the error count (total number of error bits). By this means, the connection of the physical layer including the optical fiber transmission path 6 is confirmed.

In the above-described remote monitoring of the prior art, all the monitoring signals RMT-EQP, RMT-POWER, and similar sent from an in-home MC 2 to the in-station MC 1 are supplied by the in-station MC 1 to the OpS, and in addition, the alarm signals UPLINK, DOWNLINK, and similar monitored by the in-station MC 1 are all supplied to the OpS.

Hence alarm signals giving notification of abnormalities occurring due to the same cause may be supplied to the OpS as a plurality of different alarm signals. For example, if a fault occurs in the optical segment between an in-home MC 1 and in-station MC 2, optical reception abnormality alarm signals RMT-FX-LINK and alarm signals DOWNLINK indicating a link break of the subscriber line port of the in-station MC 1 are collected by the in-station MC 1, and these are supplied to the OpS and displayed. And, when a power failure occurs in an in-home MC 2, the transmission optical power of the in-home MC 2 may fall, or the UTP-side link of the in-home MC 2 may be broken, so that the alarm signals DOWNLINK and RMT-TX-LINK are collected by the in-station MC 1, and the OpS is notified and results are displayed.

Thus in the prior art, alarm information collected by the in-station MC 1 is sent to and displayed at the OpS without modification, so that when a single alarm cause in an in-home MC 2 causes a plurality of alarm signals, it is not possible to identify the cause.

Further, in the conventional loopback tests, the test frame passes through the physical layer comprising the OAM sublayer of the in-station MC 1, but does not pass through the logical layer. Hence when an abnormality occurs in a logical layer device (for example, a MAC chip), this abnormality could not be detected by a loopback test. That is, when an abnormality occurs in a logical layer device, despite the fact that there is no abnormality in tests using test frames, in actual operation user frames cannot pass through the logical layer device, and so transmission of user frames is not possible.

SUMMARY OF THE INVENTION

A first object of the present invention is to enable identification of the cause of abnormality when abnormality is detected in remote monitoring.

A second object of the present invention is to eliminate superfluous alarms sent from the in-station MC to the OpS.

A third object of the present invention is to enabling testing of the entire system including the physical layer and logical layer.

A subscriber line terminal device according to a first aspect of the present invention is a subscriber line terminal device, connected by an optical fiber to a subscriber line terminating device, comprising: a reception unit, which receives a plurality of monitoring signals sent from said subscriber line terminating device via said optical fiber, said plurality of monitoring signals indicating normality or abnormality of a plurality of monitored items in the subscriber line terminating device respectively; and a selection unit, which, when two or more among said plurality of monitoring signals received by said reception unit indicates abnormality, selects a monitoring signal with high order of priority from among the two or more monitoring signals indicating abnormality, based on a prescribed order of priority.

According to the first aspect of the present invention, when two or more monitoring signals among the plurality of monitoring signals indicate abnormality, the monitoring signal with higher order of priority is selected from among the two or more monitoring signals indicating abnormality, based on a prescribed priority order. Hence by notifying OpS or similar of the selected monitoring signal, superfluous alarm notifications can be eliminated. Also, by taking a monitoring signal with high order of priority (that is, the selected monitoring signal) as indicating the root cause of the abnormality, the cause of the abnormality can be identified uniquely.

A subscriber line terminal device according to a second aspect of the present invention is a subscriber line terminal device, connected by an optical fiber to a subscriber line terminating device, comprising: a monitoring unit, which monitors normality or abnormality of a plurality of monitored items within said subscriber line terminal device, and outputs at least one alarm signal corresponding to at least one monitored item for which abnormality is detected; and a selection unit, which, when said monitoring unit outputs two or more alarm signals corresponding to two or more monitored items among said plurality of monitored items respectively, selects one alarm signal with high order of priority from among the two or more alarm signals based on a prescribed order of priority.

According to the second aspect of the present invention, similarly to the first aspect, by notifying OpS or similar of the selected monitoring signal, superfluous alarm notifications can be eliminated. Also, by taking a monitoring signal with high order of priority (that is, the selected monitoring signal) as indicating the cause of the abnormality, the cause of the abnormality can be identified uniquely.

A subscriber line terminal device according to a third aspect of the present invention is a subscriber line terminal device, connected by an optical fiber to a subscriber line terminating device, comprising: a monitoring unit, which monitors normality or abnormality of a plurality of monitored items within said subscriber line terminal device, and outputs alarm signals corresponding to monitored items for which abnormality is detected; a reception unit, which receives a plurality of monitoring signals sent from said subscriber line terminating device via said optical fiber, said plurality of monitoring signals indicating normality or abnormality of a plurality of monitored items in the subscriber line terminating device respectively; and a selection unit, which, when said monitoring unit outputs two or more alarm signals corresponding to two or more monitored items among said plurality of monitoring signals respectively, selects a monitoring signal with high order of priority from among the two or more alarm signals, based on a prescribed order of priority, and, when two or more among said plurality of monitoring signals received by said reception unit indicate abnormality, selects a monitoring signal with high order of priority from among the two or more monitoring signals indicating abnormality, based on said order of priority; or, when said monitoring unit outputs at least one alarm signal corresponding to at least one monitored item from among said plurality of monitored items, and moreover at least one among said plurality of monitoring signals received by said reception unit indicates abnormality, selects an alarm signal or monitoring signal with high order of priority from among at least one of said alarm signals and at least one of said monitoring signals, based on said order of priority.

According to the third aspect of the present invention, advantageous results similar to those of the above first and second aspects are obtained.

A subscriber line terminal device according to a fourth aspect of the present invention is a subscriber line terminal device having a physical layer device, a logical layer device and an OAM sublayer device, said physical layer device being connected via an optical fiber to a subscriber line terminating device and performing physical layer processing of data communicated via said optical fiber, said logical layer device performing logical layer processing of the data, said OAM sublayer device performing processing of an OAM sublayer constituting part of said physical layer and being connected to said physical layer device and to said logical layer device; wherein said OAM sublayer device comprises: a test frame processing unit, which generates a test frame containing a payload portion having test data to perform a loopback test between the OAM sublayer device and said subscriber line terminating device or said physical layer device, which transmits said test frame to said logical layer device, which receives from said logical layer device said test frame returned back from said subscriber line terminating device or said physical layer device, and which inspects the received test frame; and a port unit, which transfers said test frame received from said logical layer device to said physical layer device, and which transfers said test frames received from said physical layer device to said logical layer device; and wherein said logical layer device comprises a transfer unit, which transfers said test frame from said test frame processing unit to said port unit, and which transfers said test frame from said port unit to said test frame processing unit.

According to the fourth aspect of the present invention, test frames are also transmitted to logical layer devices, and loopback tests are performed via logical layer devices. Hence tests of the overall [system], including the physical layer and logical layer, can be performed.

A loopback test method according to the present invention is a loopback test method for a subscriber line terminal device having a physical layer device, a logical layer device and an OAM sublayer device, said physical layer device being connected via an optical fiber to a subscriber line terminating device and performing physical layer processing of data communicated via said optical fiber, said logical layer device performing logical layer processing of the data, said OAM sublayer device performing processing of an OAM sublayer constituting part of said physical layer and being connected to said physical layer device and said logical layer device; said method comprising: generating and transmitting to said logical layer device a test frame, containing a payload portion having test data, in order to perform a loopback test between the OAM sublayer device and said subscriber line terminating device or said physical layer device, in said OAM sublayer device; transferring said test frame from said OAM sublayer device to said physical layer device via said OAM sublayer device, in said logical layer device; returning said test frame, returned from said subscriber line terminating device or from said physical layer device, to said logical layer device, in said OAM sublayer device; further returning said test frame, returned from said OAM sublayer device, to said OAM sublayer device, in said logical layer device; and receiving and inspecting said test frame returned from said logical layer device, in said OAM sublayer device.

DESCRIPTION OF THE PREFERRED EMBODIMENTS

FIG. 1A and FIG. 1B are block diagrams showing the overall configuration of a subscriber-based optical communication system according to an embodiment of the present invention. Details of this figure have already been discussed in the section on the related art, and so further explanation is here omitted; below, the detailed configuration of an in-station MC 1 according to the embodiment of the present invention, processing for alarm notification, and processing of loopback tests are explained.

In-Station MC Configuration

Figure 4:
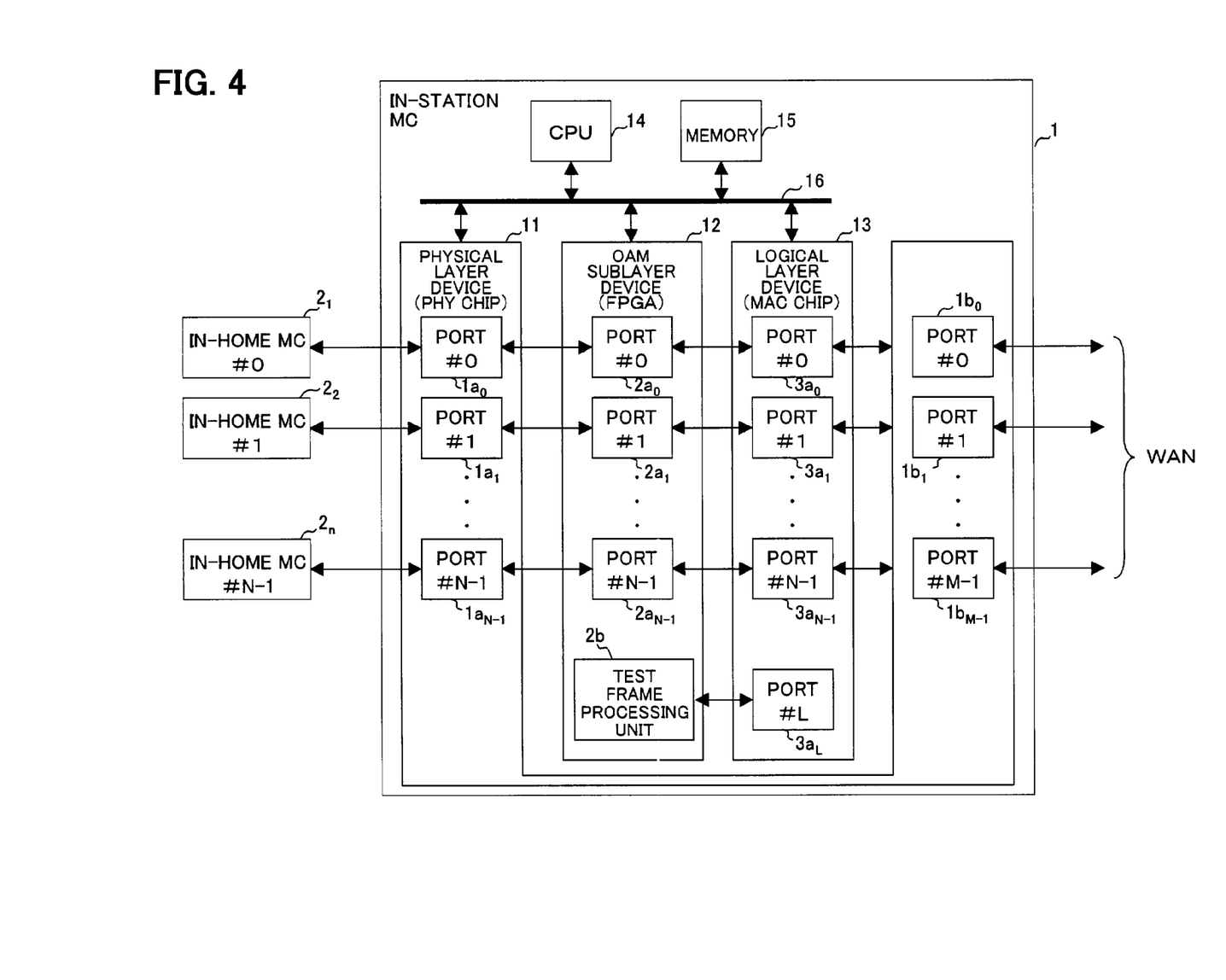
FIG. 4 is a block diagram showing the detailed configuration of an in-station MC according to the embodiment of the present invention.

FIG. 4 is a block diagram showing the detailed configuration of an in-station MC 1 according to the embodiment of the present invention.

The in-station MC 1 has devices corresponding to each of the layers of the logical hierarchy model of communication shown in the above-described FIG. 2; as an example in this embodiment, the in-station MC 1 has a physical layer device 11 which executes processing for the physical layer, excluding the OAM sublayer; an OAM sublayer device 12 which executes processing for the OAM sublayer; a logical layer device 13 which executes processing for the logical layer (MAC layer); a CPU 14; and memory (RAM, ROM) 15.

The physical layer device 11 comprises, for example, a general-purpose PHY chip. The OAM sublayer device 12 comprises, for example, an ASIC (for example, a FPGA, or field programmable gate array) which is dedicated hardware. The logical layer device 13 comprises, for example, a general-purpose MAC chip.

These constituent components 11 to 15 are connected to an internal bus 16, and can communicate mutually via the internal bus 16.

The CPU 14 executes a program stored in memory 15, and controls the in-station MC 1. For example, the CPU 14 detects memory errors and timer abnormalities, and notifies the OAM sublayer device 12 of any detected abnormalities in the form of alarm signals EQP (see FIG. 3D).

The physical layer device 11 has N port units (where N is an integer equal to or greater than 2) $1a_0$ to $1a_{N-1}$. The port units $1a_0$ to $1a_{N-1}$ are provided to correspond respectively to ports #0 to #N-1, connected to in-home MCs 2#0 to 2#N-1 (in FIG. 1B, in-home MCs $2_1$ to $2_n$) via optical fibers 6. These port units $1a_0$ to $1a_{N-1}$ monitor the state of the optical fiber to which they are connected, and when an abnormality is detected, send a monitoring signal RMT-FX-LINK shown in the above FIG. 3C or an alarm signal DOWNLINK shown in FIG. 3D to the OAM sublayer device 12.

In FIGS. 1A and 1B, the in-station MC 1 is connected to the WAN 4 by a single UTP cable, but may be connected to the WAN 4 by a plurality of ports and a plurality of UTP cables. Hence in FIG. 4, the physical layer device 11 has, on the other hand, port units $1b_0$ to $1b_{M-1}$ corresponding respectively to M ports #0 to #M-1 (where M is an integer equal to or greater than 2) connected to the WAN 4. These port units $1b_0$ to $1b_{M-1}$ monitor the state of the UTP cable to which they are connected, and when an abnormality is detected, send the alarm signal shown in the above FIG. 3D to the OAM sublayer device 12.

The OAM sublayer device 12 has port units $2a_0$ to $2a_{N-1}$ corresponding respectively to the ports #0 to #N-1, a test frame processing unit 2b, and a device, not shown, which is an interface with the OpS.

These port units $2a_0$ to $2a_{N-1}$ have the same circuit configuration, and have an ether-type discrimination function, described below, address substitution function, and FCS (frame check sequence) calculation function.

The port unit $2a_i$ (where i is any integer from 0 to N-1) of the OAM sublayer device 12 and the port unit $1a_i$ of the physical layer device are interconnected, and able to communicate with each other. The port unit $2a_i$ provide control signals supplied from the OpS via the interface device to the corresponding port unit $1a_i$.

On the other hand, the port unit $2a_i$ collect monitoring signals (see FIG. 3C) received from the in-home MC device #i and alarm signals (see FIG. 3D) detected by the port unit $1a_i$ itself. The port unit $2a_i$ processes the collected monitoring signals and alarm signals based on a prescribed order of priority, and notifies the OpS of the processed monitoring signals and alarm signals via the interface device. The order of priority, and the processing based on the order of priority, will be described below.

The test frame processing unit 2b generates a test frame to be used in a loopback test, sends the test frame to the in-home MC 2, checks the test frame returned from the in-home MC 2, and notifies the OpS of the check results. The details of the loopback test and test frame will be described below.

The logical layer device 13 has port units $3a_0$ to $3a_{N-1}$, corresponding to the ports #0 to #N-1. The logical layer device 13 also has a port unit $3a_L$ for port #L differing from ports #0 to #N-1 (and therefore L≠0 to N-1). These port units $3a_0$ to $3a_{N-1}$ have the same circuit configuration, and have an address learning function and a storage register in which an address is set.

The port unit $3a_i$ of the logical layer device 13 and the port unit $2a_i$ of the OAM sublayer device are interconnected and capable of mutual communication. The port unit $3a_i$ is interconnected with one of the port units $1b_0$ to $1b_{M-1}$ and capable of mutual communication. The test frame processing unit 2b and port unit $3a_L$ are interconnected, and capable of mutual communication. The port units $3a_0$ to $3a_{N-1}$ and $3a_L$ are connected within the logical layer device 13, and capable of mutual communication.

The data signal (user data) sent from an in-home MC 2#i is sent again to the physical layer device 11 via the port unit $1a_i$ of the physical layer device 11, port unit $2a_i$ of the OAM sublayer device 12, and port unit $3a_i$ of the logical layer device 13, and is sent to the WAN 4 from the port unit $1b_j$ (where j is any integer from 0 to M-1) according to the address. On the other hand, a data signal received at the port unit $1b_j$ of the physical layer device 11 from the WAN 4 is sent to the in-home MC 2#i via the port unit $3a_i$ of the logical layer device 13, port unit $2a_i$ of the OAM sublayer device 12, and port unit $1a_i$ of the physical layer device 11, according to the address. In this way, communication is performed between the in-home MC 2#i and the WAN.

By means of the in-station MC 1 having such a configuration, processing for the alarm notification and loopback testing according to this embodiment of the present invention is executed. Below, after first explaining alarm notification, loopback tests are explained.

Alarm Notification

Monitoring signals from an in-home MC 2 to the in-station MC 1 include "LOOP-MCS", "RMT-POWER", "RMT-FX-LINK", "RMT-TX-LINK", and "RMT-EQP", indicated in the above-mentioned FIGS. 3A and 3C. As the meanings of these signals, as stated above, the monitoring signals RMT-POWER, RMT-FX-LINK, RMT-TX-LINK, and RMT-EQP are used to transmit alarms to the in-station MC 1 (alarm signals) when a device abnormality occurs in the in-home MC 2.

Figure 5A:
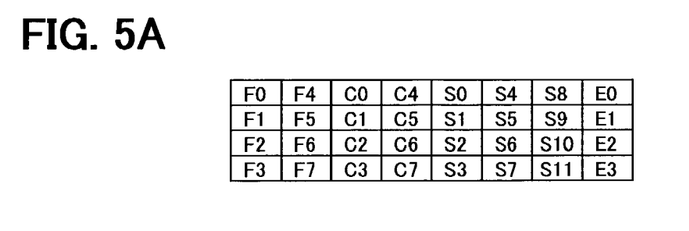
FIG. 5A shows the frame format of an OAM frame.
Figure 5B:
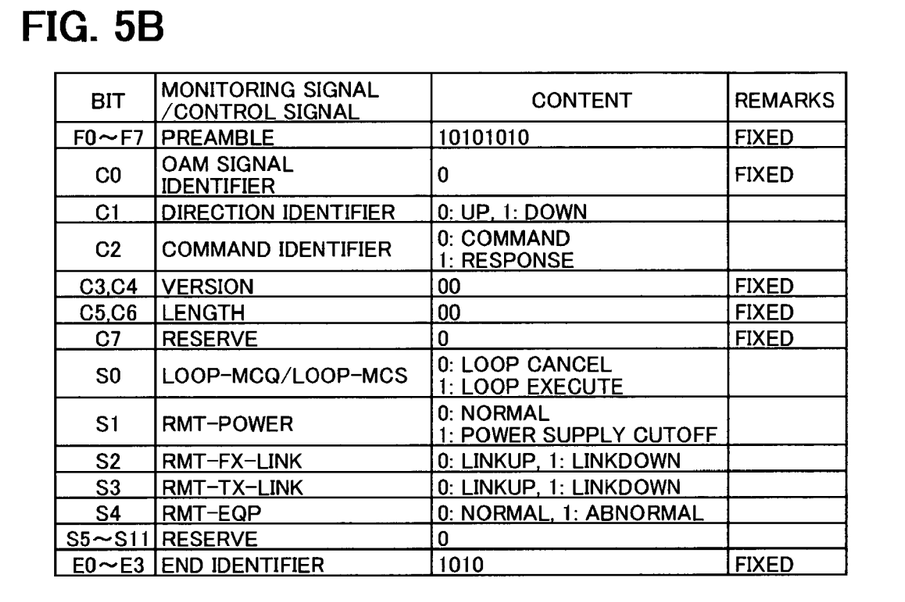
FIG. 5B indicates the contents of each data bit comprised by an OAM frame.

Monitoring signals are sent using OAM frames, as explained above. FIG. 5A shows the frame format of an OAM frame (with notation for the case of 4-bit parallel transmission); FIG. 5B indicates the contents of each data bit comprised by an OAM frame. This OAM frame format is the normal OAM frame format.

The leading 7 bits of data F0 to F7 are the preamble signal bits. The single bit C0 following the preamble signal bits is the OAM signal identifier; if the value of this is 0, the in-station MC 1 and in-home MC 2 can discriminate this frame as being an OAM frame (that is, a frame for OAM signals).

In an OAM frame sent from the in-station MC 1 to the in-home MC 2, the single bit SO is a LOOP-MCQ control signal indicating a loopback test initiation request or cancellation request; in an OAM frame sent from the in-home MC 2 to the in-station MC 1, SO is a LOOP-MCS monitoring signal indicating a loopback test initiation response or cancellation response.

The data bit S1 is the RMT-POWER monitoring signal, which indicates whether the power supply of the in-home MC 2 is normal or abnormal; "0" indicates the power supply is normal, and "1" indicates that abnormality in the power supply has occurred (that is, that power has been cut off). By monitoring the power supply level, the in-home MC 2 (physical layer device) judges whether the power supply is normal or abnormal.

The data bit S2 is the RMT-FX-LINK monitoring signal, which indicates whether a signal received by the in-home MC 2 via the optical fiber 6 is LINKUP (normal) or LINKDOWN (abnormal); if "0", the signal is normal, and "1" indicates that an abnormality has occurred in reception. The cause of the abnormality of the optical signal is breakage of the optical fiber 6, a malfunction of the receiving photodiode in the in-home MC 2, a malfunction of the transmission laser diode in the in-station MC 1, or similar. The in-home MC 2 (physical layer device) judges whether the received signal is normal or abnormal by monitoring the received light level and symbol error rate or similar.

The data bit S3 is the RMT-TX-LINK monitoring signal, which indicates whether the UTP 7 connecting the in-home MC 2 and PC 3 is LINKUP (normal) or LINKDOWN (abnormal); "0" indicates normal, and "1" indicates that an abnormality has occurred. The in-home MC 2 (physical layer device) judges whether the UTP 7 is normal or abnormal by monitoring the symbol rate or similar.

The data bit S4 is the RMT-EQP monitoring signal, which indicates whether the in-home MC 2 is normal or malfunctioning; "0" indicates normal, and "1" indicates that an abnormality has occurred. Malfunctions of the in-home MC 2 include, for example, an internal memory error, timer malfunction, CPU failure or similar of the in-home MC 2; by monitoring these states, the in-home MC 2 (CPU and other processing equipment) can judge whether the in-home MC 2 is normal or abnormal.

These data bits are mapped to a MII (media-independent interface) (see FIG. 2) between the OAM sublayer and physical layer.

Figure 6:
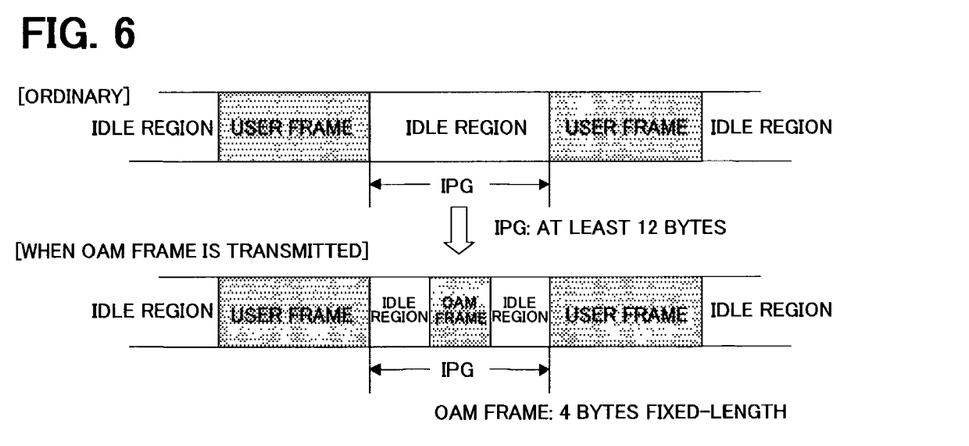
FIG. 6 shows an OAM frame is inserted into an idle region (IPG) and transmitted.

This OAM frame is inserted into an idle region (IPG: inter-packet gap) provided between user frames carrying data signals (user data) for transmission (in-band transmission), as shown in FIG. 6. Specifically, an idle pattern in the IPG is replaced with the OAM frame, and the OAM frame is transmitted. As a result, the OAM frame can be transmitted over the same media used to transmit user frames (single-mode optical fiber), without interfering with user frames.

In some cases OAM frames are inserted into all IPGS; in other cases, OAM frames are inserted after a prescribed number of IPGs. In either case, OAM frames are transmitted and received at prescribed intervals (time intervals).

In in-home MCs 2 and in-station MCs 1, the data bits C0 to C6 in the frame and the frame length are measured to judge whether a frame is an OAM frame, and if a frame is judged to be an OAM frame, it is terminated. Hence OAM frames are not transmitted to the UTP cables 5 and 7 connected to the in-home MC 1 and in-station MC 2. Further, even if a PC on the WAN 4 accesses an in-home MC 2 and in-station MC 1 via a UTP cable 5, or a PC 3 accesses the in-home MC 2 via the UTP cable 7, it is not possible to modify the settings of the OAM frame data.

OAM frames send from an in-home MC 2#i to an in-station MC 1 are provided to the port unit $2a_i$ of the OAM sublayer device 12 from the port unit $1a_i$ of the physical layer device 11 of the in-station MC 1. When a monitoring signal contained in the OAM frame is LOOP-MCS, or when it is not an alarm signal (that is, when RMT-EQP, RMT-POWER, RMT-TX-LINK, and RMT-FX-LINK are normal), the port unit $2a_i$ provides these monitoring signals unchanged to the OpS via the interface device.

On the other hand, when at least one of the monitoring signals contained in the OAM frame is an alarm signal (that is, when at least one among RMT-EQP, RMT-POWER, RMT-TX-LINK, and RMT-FX-LINK is abnormal), the port unit $2a_i$ executes processing to select the alarm signal based on the prescribed order of priority, and the alarm signal selected through this selection processing is sent to the OpS.

A DOWNLINK alarm signal detected by the port unit $1a_i$ of the physical layer device 11, UPLINK alarm signal detected by the port unit $1b_i$, and EQP alarm signal detected by the CPU 14 are also provided to port $2a_i$. The port unit $2a_i$ executes selection processing of these alarm signals also, according to a prescribed order of priority, and provides the alarm signal selected by this selection processing to the OpS.

Figure 7:
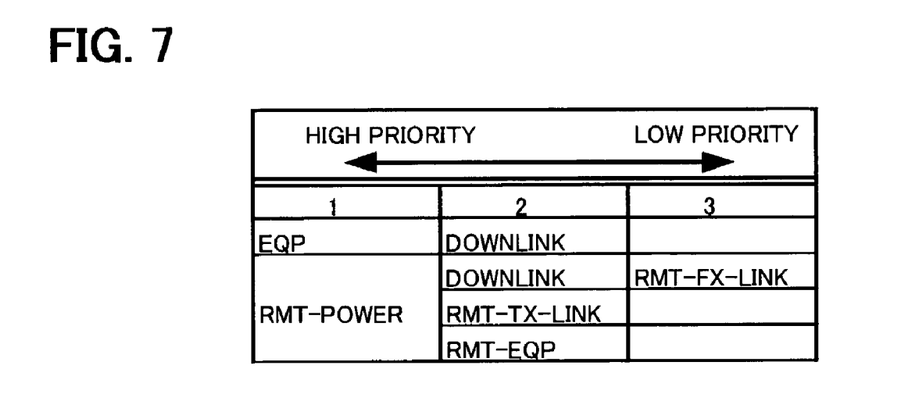
FIG. 7 shows an example of a prescribed order of priority in table format.

FIG. 7 shows an example of a prescribed order of priority of this embodiment, in table format (priority order table). In this figure, signals are assigned "1", "2", or "3", according to the priority.

When two or more alarm signals with different priority orders are received, either simultaneously or within a prescribed time (the "prescribed time" will be discussed below), the OAM sublayer device 12 selects an alarm signal with high priority, and notifies OpS via the interface device of the selected alarm signal.

This order of priority stipulates that, when two or more alarm signals are received either simultaneously or within a prescribed time, the malfunction corresponding to the alarm signal with higher priority order has occurred.

For example, when the OAM sublayer device 12 receives both an alarm signal EQP due to a device malfunction in the in-station MC 1 and a DOWNLINK alarm signal due to a link break of the in-station MC 1, the cause of the occurrence of these two alarm signals is taken to be the device malfunction corresponding to the EQP alarm signal, with the higher order of priority, so that the EQP alarm signal with higher order of priority is selected, and the EQP alarm signal is sent to the OpS.

Similarly, when three alarm signals, RMT-POWER, DOWNLINK, and RMT-FX-LINK are received, RMT-POWER is selected. When the alarm signals RMT-POWER and DOWNLINK are received, the former is selected; when the alarm signals RMT-POWER and RMT-EQP are received, the former is selected.

The relation between the priorities 2 and 3, and the relation between the priorities 1 and 3 are similar; when the alarm signals DOWNLINK and RMT-FX-LINK are received, the former is selected. When the alarm signals RMT-POWER and RMT-FX-LINK are received, the former is selected.

Here the priority order stipulates the relation only between alarm signals in the same row (horizontal-direction row), and does not stipulate a relation between alarm signals positioned in different rows. Hence if, for example, the alarm signals RMT-TX-LINK and RMT-FX-LINK are received simultaneously or within a prescribed time, the OAM sublayer device 12 does not select either alarm signal, but sends both alarm signals to the OpS. Similar processing is performed for other alarm signals positioned in different rows.

In this way, when a plurality of alarm signals for which the priority order is stipulated, and which are in a priority order relationship, are received simultaneously or within a prescribed time, the alarm signal with higher priority is selected and sent to the OpS, and by this means the OpS operator (or supervisor) can identify a single cause of the fault. Also, the OAM sublayer device 12 can be prevented from sending superfluous alarm signals to the OpS, so that operators can find cause of faults easily.

Here, the reason for adding "within a prescribed time" to "simultaneous" as the condition for the time at which alarm signals are received is as follows. Alarm signals from the in-home MC 2 (RMT-POWER, RMT-TX-LINK, RMT-FX-LINK, and RMT-EQP) are received by the in-station MC 1 in the same OAM frame, and so can be processed simultaneously. However, alarm signals detected and sent from the physical layer device 11 of the in-station MC 1 (EQP, DOWNLINK, and similar) are generally sent with a time difference with respect to alarm signals received in an OAM frame from an in-home MC 2. Consequently if priority processing is not performed for a plurality of alarm signals received within a prescribed time, the OAM sublayer device 11 sends a plurality of alarm signals, including unwanted alarm signals, to the OpS, similarly to the prior art. Hence the condition that signals be received within a prescribed time is adopted.

This prescribed time is set to, for example, a time substantially equal to two or three times the period T at which the OAM sublayer device 12 performs alarm signal polling (polling period). That is, on receiving one of the alarm signals shown in the table of FIG. 7, the OAM sublayer device 12 waits to receive other alarm signals for a time 2T or 3T. If other alarm signals are received, the OAM sublayer device 12 performs priority processing, and sends the alarm signal with higher priority to the OpS; if no other alarm signals are received, the OAM sublayer device 12 performs no priority processing, and sends the alarm signal initially received to the OpS.

Figure 8:
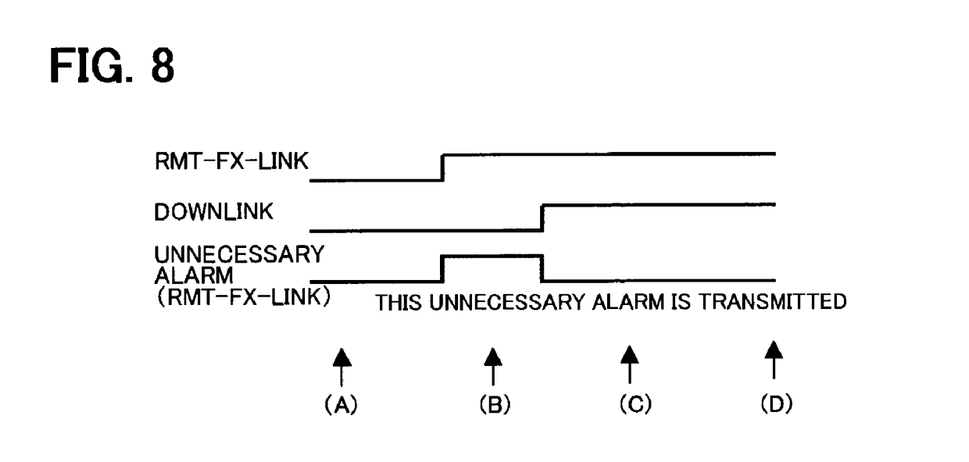
FIG. 8 is a time chart showing an example of alarm signal priority processing.

FIG. 8 is a time chart showing an example of alarm signal priority processing. At the alarm monitoring time (that is, the polling time) (B), when an RMT-FX-LINK alarm signal is received, the OAM sublayer device 12 waits for substantially two periods, and at the polling time (D), if a DOWNLINK alarm signal is detected, selects and sends DOWNLINK to the OpS. On the other hand, if the DOWNLINK alarm signal is not received, the OAM sublayer device 12 sends the RMT-FX-LINK alarm signal to the OpS.

A situation opposite that shown in FIG. 8, in which the DOWNLINK alarm signal is received before RMT-FX-LINK, does not occur. This is because in the event of a link break, the in-station MC 1 cannot receive an OAM frame. Hence the OAM sublayer device 12 need not wait for the prescribed length of time to perform priority processing in the case of an alarm signal order which can never occur.

This priority processing is performed independently for each port unit of the OAM sublayer device 12.

In the embodiment described thus far, alarm signals are sent to the OpS; however, alarm signals may be displayed on a display device (CRT display, liquid crystal display, or similar) of the in-station MC 2 as well.

Loopback Tests

Next, loopback tests of this embodiment are explained. The loopback tests according to this embodiment are performed including the logical layer device 13 of the in-station MC 1. By this means, tests of the logical layer can be performed, and the logical layer can be checked for normal or abnormal operation.

In order to perform loopback tests including the logical layer device 13, in this embodiment the test frames are sent so as to pass through not only to the OAM sublayer device 12 and physical layer device 11, but the logical layer device 13 as well.

Specifically, a test frame created by the test frame processing unit 2b of the OAM sublayer device 12 in the in-station MC 1 is sent to the logical layer device 13, and is sent from the logical layer device 13 to a specified port unit $2a_i$ of the OAM sublayer device 12. The test frame is supplied from the port unit $2a_i$ to the port unit $1a_i$ of the physical layer device 11, and is sent from the port unit $1a_i$ to the in-home MC 2#i via optical fiber. Then, the test frame returned from the in-home MC 2#i is input from the port unit $1a_i$ to the logical layer device 13 via the port unit $2a_i$, and returns from the logical layer device 13 to the test frame processing unit 2b.

Because there exists no logical layer in the in-home MC 2, test frames pass through a physical layer device and OAM sublayer device in an in-home MC 2 (see FIG. 2). If there exists a logical layer device in the in-home MC 2, test frames may pass through this logical layer as well.

Figure 9:
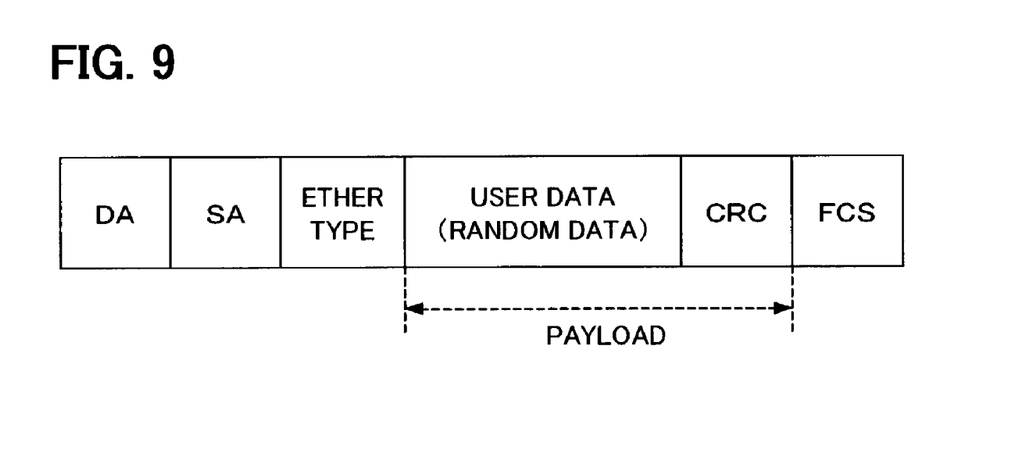
FIG. 9 shows the format for test frames according to an embodiment of the present invention.

In order that test frames can pass through the logical layer, test frames are not special frames as in the prior art, but are MAC frames. FIG. 9 shows the format for test frames of this embodiment.

A test frame has a destination address (destination MAC address) DA (6 bytes); source address (transmission source MAC address) SA (6 bytes); ether type (frame type) (2 bytes); user data (48 to 1498 bytes); CRC (2 bytes); and frame check sequence FCS (4 bytes). The user data and CRC constitute the payload portion. The test frame processing unit 2*b* generates this test frame.

Since this test frame is transmitted only between the in-station MC 1 and in-home MC 2, and is not transmitted to a PC 3 or WAN 4, there is no need in particular to specify the destination MAC address (hereafter abbreviated to "destination address") DA; however, in this embodiment the port address (port number) of the logical layer device 13 which is the transmission source is specified. As a result, debugging is facilitated.

The transmission source MAC address (hereafter abbreviated to "source address") SA also need not be specified, but to facilitate debugging, is set to the port number of the port #L which is the port to which the test frame processing unit 2*b* is connected.

The ether type (frame type) in a test frame is set to the fixed value 0x9000, indicating a loopback. Random values for testing are set as the user data. As the CRC, the value resulting from calculation of the expression $x^{16}+X^{15}+x^2+1$ for the values of user data from the beginning of the payload portion to immediately before the CRC is stored. The FCS computation result conforming to IEEE 802.3 is stored as the FCS.

The reason for using random data (user data) and a CRC as the payload in order to inspect a test frame for normality is as follows. In general-purpose logical layer. devices (for example, MAC chips), FCS inspections of received frames are performed, and if errors are detected, the frame is discarded. However, when a frame is transmitted to external equipment, often an FCS computation is performed, and the new computation result is used to overwrite the FCS area. If a bit error were to occur within the logical layer, the FCS computation and overwriting would be performed with the error in the data, so that error detection would not be possible. Hence by performing CRC inspection of the payload, errors occurring within the logical layer device can be detected.

When transmitting to the optical fiber 7, an 8-byte preamble is added to the head of the frame.

Loopback tests using this test frame may employ a first method utilizing a switching function based on logical layer MAC address learning, and a second method utilizing virtual LAN (VLAN, virtual local area network) functions. Below, the details of each are explained.

(1) First Method

Figure 10:
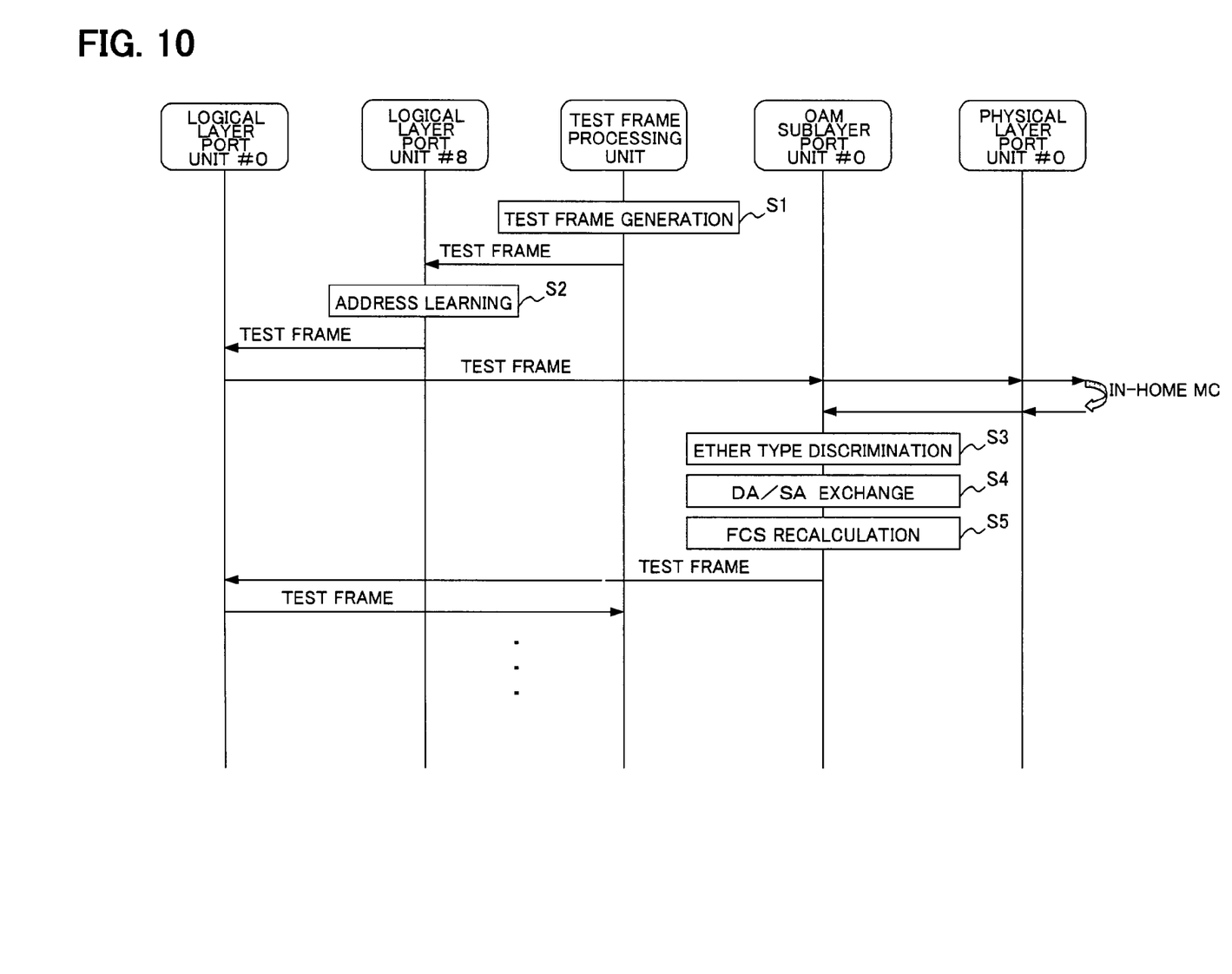
FIG. 10 is a sequence diagram showing the flow of processing of loopback tests using the first method.

In the first method, the logical layer device 13 discriminates the destination address DA and source address SA of the test frame, and utilizing the address learning function and switching function of the logical layer device 13, the port #i to which the in-home MC 2 being tested is connected is selected, and test frame transmission is performed.

FIG. 10 is a sequence diagram showing the flow of processing of loopback tests using the first method. Here, as one example, the port #L of the logical layer device 13 to which the test frame processing unit 2*b* is connected (port unit 3*a$_L$*) is port #8, with N=8, and port #N−1 is set to port 7. The case in which tests are performed for port #0 is explained.

In FIG. 10, similarly to the prior art, OAM frames are used to send and receive a loopback test initiation request (LOOP-MCQ) and an initiation response (LOOP-MCS); the loop point is set in the physical layer of the in-home MC 2, and likewise for the in-station MC 1, after the loop path is set in the physical layer, processing is performed.

The test frame processing unit 2*b* generates a test frame in which the destination MAC address DA is the port number (assumed to be 0x00-00-00-00-00-01) of the unit #0 of the logical layer device 13, and the source MAC address SA is the #8 port number (0x00-00-00-00-00-09) (step S1). Both addresses are unicast addresses.

Next, the test frame processing unit 2*b* sends the generated test frame to the logical layer device 13. By receiving the test frame, the port unit 3*a$_L$* (port #8) of the logical layer device 13 learns the source address SA, 0x00-00-00-00-00-09, and writes 0x00-00-00-00-00-09 to the address learning memory (not shown) held by the logical layer device 13 as the address of port #8 (local address) (step S2).

The logical layer device 13 refers to the destination address DA of the test frame and outputs the test frame from the port #0 indicated by this address. The addresses 0x00-00-00-00-00-01 to 0x00-00-00-00-00-08 corresponding to the ports #0 to #7 of the logical layer device 13 are set in advance by the CPU 14, at the time of initial settings, in the address learning memory held by the logical layer device 13. The logical layer device 13 transfers and outputs the test frame to the port having the address agreeing with the destination address DA.

The test frame output from port #0 of the logical layer device 13 is received by the port #0 (port unit 2*a$_0$*) of the OAM sublayer device 12, and is sent to the in-home MC 2$_1$ from the port #0 (port unit 1*a$_0$*) of the physical layer device 11.

The test frame returned from the in-home MC 2$_1$ is received by the port 2*a$_0$* of the OAM sublayer device 12, via the port unit 1*a$_0$* of the physical layer device 11. When the port unit 2*a$_0$* of the OAM sublayer judges that the received test frame (MAC frame) is an either type test frame (step S3), the destination address DA and source address SA are exchanged (that is, DA=0x00-00-00-00-00-09, SA=0x00-00-00-00-00-01) (step S4). Then, based on the exchanged addresses, the port unit 2*a$_0$* of the OAM sublayer recalculates the FCS (step S5), and sends the frame to the port unit 3*a$_0$* of the logical layer device 13.

The port unit 3*a$_0$* of the logical layer device 13 is retrieved from an address learning table as the port matching the destination address DA of the received test frame. The destination address DA 0x00-00-00-00-00-09 is stored in the address learning table as the address of the destination port #8 by means of the address learning function; hence the test frame is sent to the port #8, and is provided to the test frame processing unit 2*b* from the port #8.

After the FCS recalculation of step S5, if a data error occurs, the FCS error is detected at the time of reception by the logical layer device 13, and the test frame is discarded.

The test frame processing unit 2*b* performs a CRC inspection of the received test frame. If, as a result of the CRC inspection, an error is detected, the test frame processing unit 2*b* increments the value of the error-counter held by the test frame processing unit 2*b* itself.

The loopback test using this test frame is repeated a plurality of times (for example, 256 times) for one port; during this time, cumulative addition of the CRC inspection error-counter is performed. The test frame processing unit 2*b* also counts the number of returned test frames. The difference between the number of transmitted test frames and the number of returned test frames signifies the number of frames discarded due to FCS errors.

After the end of tests, the test frame processing unit 2*b* sends to the OpS the number of received frames and the number of frames among the received frames in which CRC errors were detected as the loopback test results.

This first method is particularly effective when a general-purpose device used as the in-home MC 2 does not guarantee the passage of IEEE 802.1Q tags, and the VLAN functions of the second method cannot be used.

In this first method, the loopback point (loop point) of test frames can be set within the physical layer device 11 of the in-station MC 1, rather than the in-home MC 2. By this means, a fault location can be singled out (narrowed down).

Also, by making the test time setting variable, measurements ranging from continuity confirmation tests for short lengths of time to long-term transmission characteristic measurements are possible. And, by making the test frame length variable, differences in continuity characteristics due to the data length can be tested.

By intentionally using an erroneous CRC value for user data (random data) when transmitting and returning frames, CRC error detection by the test frame processing unit 2b can be tested. That is, the error detection function of the test frame processing unit 2b can be tested.

Also, by combining [this method] with conventional loopback tests to test the physical layer, the fault layer can be narrowed down (identified).

(2) Second Method

Figure 11:
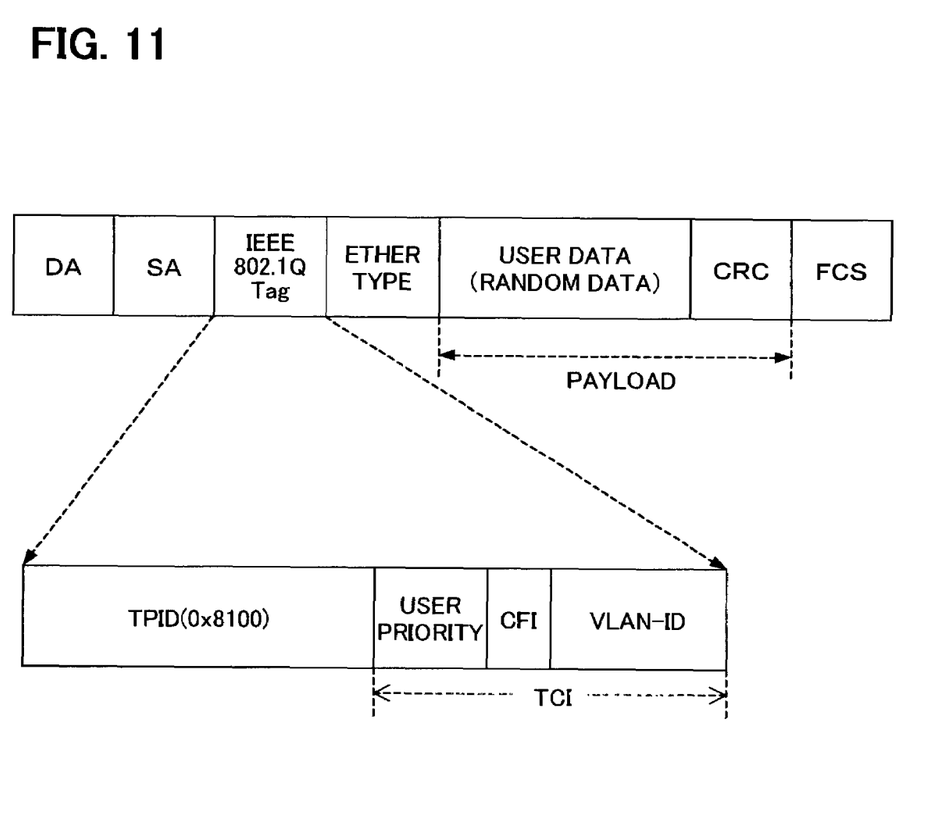
FIG. 11 shows the format of test frames in the second method.

In the second method, the destination address DA of the test frame is used as a broadcast address, and combined with IEEE 802.1Q tag functions, the port to which the in-home MC 2 for testing is connected is selected, and the test frame is transmitted.

When a device for which passage of IEEE 802.1Q tags is guaranteed is used as the in-home MC 2, it is effective to use the second method.

FIG. 11 shows the format of test frames in the second method. A difference with the test frame shown in FIG. 9 above is that an IEEE 802.1Q tag (4 bytes) is included between the source address SA and the ether type.

The destination address DA is the broadcast address 0xFF-FF-FF-FF-FF-FF. The source address is, as in the first method, the port number 0x00-00-00-00-00-09 of the port #8 to which the test frame processing unit 2b is connected.

The IEEE 802.1Q tag has a 2-byte TPID (tag protocol identifier) and 2-byte TCI (tag control identifier). The TCI further has a 3-bit user priority used in QoS, a 1-bit CFI (canonical format indicator) used in token ring and other processing, and a 12-bit VLAN-ID (VLAN identifier). In a VLAN, the TPID and VLAN-ID are necessary for processing by the logical layer device 13.

The TPID is set to 0x8100 by the test frame processing unit 2b, indicating a VLAN is used.

The VLAN-ID is an identifier used to identify each VLAN when a plurality of VLANs are set on a network. Eight VLANs connecting each of the ports #0 to #7 with the port #8 (port-type VLANS, port-based VLANS) are set in advance by the CPU 14 in the logical layer device 13 at the time initial settings are made. Each VLAN is assigned a VLAN-ID (an ID used by users) by the CPU 14 in advance. These VLAN-IDs are provided (set) by the CPU 14 in advance in the test frame processing unit 2b also.

As in FIG. 9, the payload has random data and a CRC; the reason for this configuration is the same as that explained for the first method.

Figure 12:
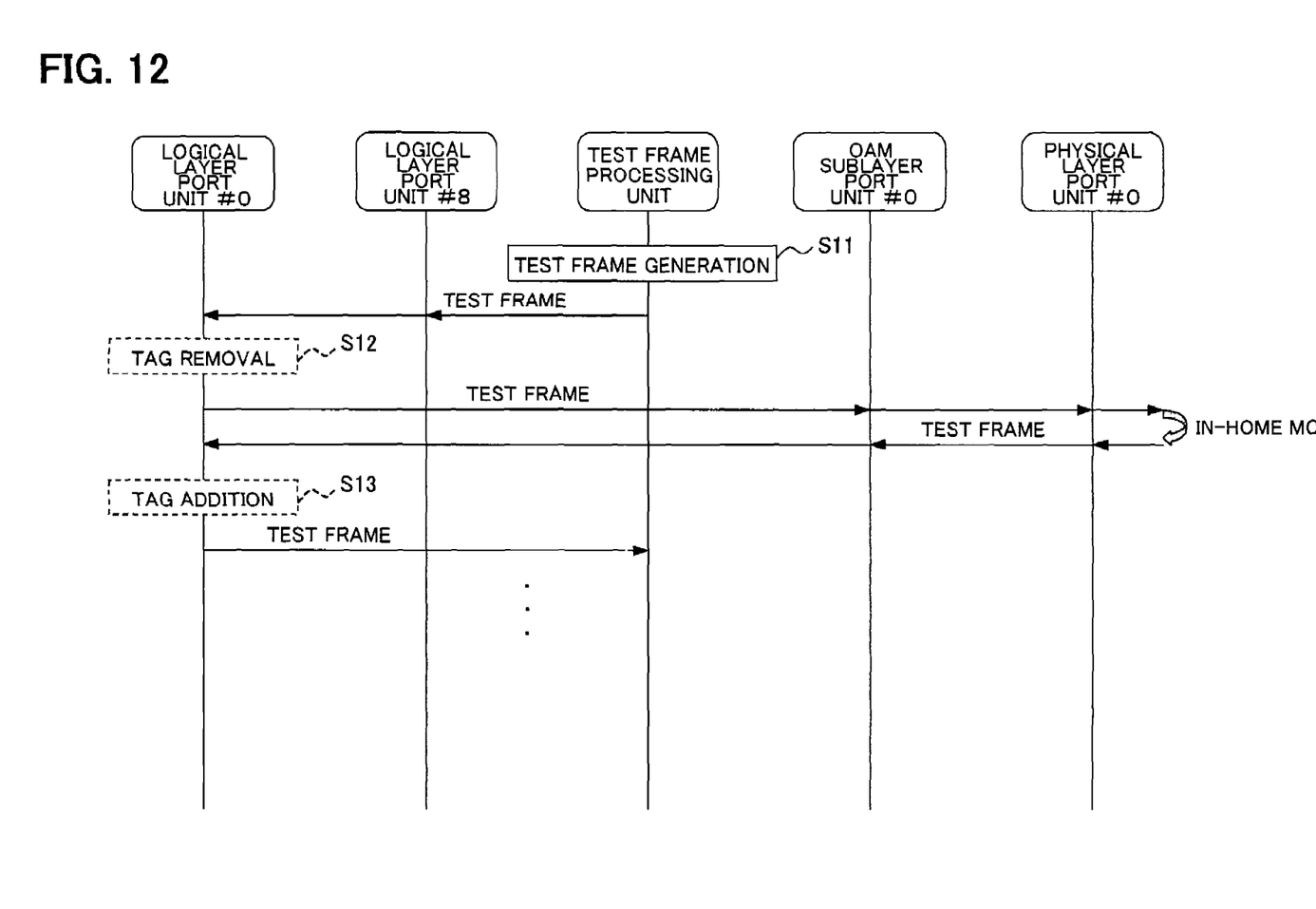
FIG. 12 is a sequence diagram showing the flow of processing of loopback tests using the second method.

FIG. 12 is a sequence diagram showing the flow of processing of loopback tests using the second method.

When the test frame processing unit 2b receives an instruction from the OpS to perform tests for, for example, port #0, a test frame is generated in which the VLAN-ID corresponding to port #0 is set (step S11), and is sent to port #8 of the logical layer device 13.

Because the TPID of the received test frame is 0x8100, port #8 recognizes that the test frame is a VLAN frame, and based on this VLAN-ID, transmits the test frame to the port #0 of the logical layer device 13. The destination address DA is a broadcast address; but because the destination port belonging to the VLAN for testing is port #0, the test frame is transmitted only to port #0. By means of the address learning function of the logical layer device 13, the port address of port #8 is stored in the address learning memory as the address 0x00-00-00-00-00-09.

In the in-home MC 2, when a VLAN is permitted, port #0 of the logical layer device 13 sends the test frame without modification to port #0 of the OAM sublayer device 12. This test frame is transmitted to the in-home MC 2#0, and is then returned to port #0 of the logical layer device 13.

On the other hand, in the in-home MC 2, a VLAN may not be permitted. In this case, the port #0 of the logical layer device 13 can remove the IEEE 802.1Q tag from the test frame (step S12), and send the test frame with tag removed (in the same format as the test frame shown in FIG. 9) to port #0 of the OAM sublayer device 12. Thereafter, when the test frame returned from the in-home device 2#0 is received by port #0 of the logical layer device 13, the port #0 of the logical layer device 13 adds the deleted IEEE 802.1Q tag to the test frame (step S13).

The test frame returned from the in-home MC #0 passes through the OAM sublayer device 12, and is received by port #0 of the logical layer device 13. That is, the OAM sublayer device 13 does not execute processing to exchange the destination address DA and source address SA or to recalculate the FCS, as in the first method. As a result, high-speed transmission of the test frame becomes possible, the configuration of the OAM sublayer device 12 can be simplified, and the circuit scale can be reduced.

The port #0 of the logical layer device 13 transmits the received test frame to the port #8 according to the VLAN setting. The port address of port #0 is stored in the address learning memory as address 0x00-00-00-00-00-09 by the address learning function of the logical layer device 13. The port #8 transmits the test frame to the test frame processing unit 2b.

If an error occurs in the test frame before being received by port #0 of the logical layer device 13, the test frame is discarded as a result of FCS error detection at the time of receipt by the logical layer device 13, and is not transmitted to the test frame processing unit 2b.

As in the first method, the test frame processing unit 2b performs a CRC inspection of the received test frame, and sends the number of frames in which CRC errors were detected and the number of received frames to the OpS as the test results.

By means of this second method also, tests including the logical layer are possible, and tests can be performed more rapidly.

By receiving the test frame at the ports #0 and #8 of the logical layer device 13, these port addresses are repeatedly learned as the address 0x00-00-00-00-00-09. If this learning is repeated at high speed, it may be judged by the MAC chip that movement of the terminal (the in-home MC 2) is occurring, and the test frame may be discarded. In order to prevent this, it is preferable that the rate for transmission of the test frame be set sufficiently low that discarding of the test frame does not occur.

In the second method also, similarly to the first method, the test frame loop point can be set within the physical layer device 11 of the in-station MC 1 in addition to the in-home MC 2. By this means, the fault location can be singled out. By making the testing time variable, measurements ranging from continuity confirmation tests for short lengths of time to long-term transmission characteristic measurements are possible.

Further, by making the test frame length variable, differences in continuity characteristics due to the data length can be tested. By intentionally using an erroneous value for the calculated CRC result, the error detection function of the test frame processing unit 2b can be checked. By combining this method with conventional loopback tests which can confirm the functions of only the physical layer, the fault layer can be singled out.

In the embodiment described thus far, loopback test results are sent to the OpS; but the test results may also be displayed on a display device in the in-station MC 1.

By means of the present invention, the transmission of unnecessary alarms can be suppressed. Also, by means of this invention, alarm causes can be uniquely identified.

Further, by means of the present invention, the state of the device corresponding to the logical layer can be checked.

What is claimed is:

1. A subscriber line terminal device, connected by an optical fiber to a subscriber line terminating device, comprising:
    a reception unit, which receives a plurality of monitoring signals sent from said subscriber line terminating device via said optical fiber, said plurality of monitoring signals indicating normality or abnormality of a plurality of monitored items in the subscriber line terminating device respectively; and,
    a selection unit, which, when two or more among said plurality of monitoring signals received by said reception unit indicates abnormality, selects a monitoring signal with high order of priority from among the two or more monitoring signals indicating abnormality, based on a prescribed order of priority wherein,
    said plurality of monitoring signals include,
        a first signal, indicating normality or abnormality of a power supply of said subscriber line terminating device;
        a second signal, indicating normality or abnormality of a cable connecting said subscriber line terminating device and a user terminal;
        a third signal, indicating normality or abnormality of a reception state of optical signals of said optical fiber at said subscriber line terminating device; and
        a fourth signal, indicating normality or device abnormality of said subscriber line terminating device;
        wherein said order of priority stipulates the order of priority of said first signal and said second signal, the order of priority of said first signal and said third signal, and the order of priority of said first signal and said fourth signal.

2. The subscriber line terminal device according to claim 1, wherein said plurality of monitoring signals are transmitted from said subscriber line terminating device and received by said reception unit by means of an Operation Administration and Maintenance (OAM) frame indicating a frame to send the control signal and monitoring signal.

3. A subscriber line terminal device, connected by an optical fiber to a subscriber line terminating device, comprising:
    a monitoring unit, which monitors normality or abnormality of a plurality of monitored items within said subscriber line terminal device, and outputs alarm signals corresponding to monitored items for which abnormality is detected;
    a reception unit, which receives a plurality of monitoring signals sent from said subscriber line terminating device via said optical fiber, said plurality of monitoring signals indicating normality or abnormality of a plurality of monitored items in the subscriber line terminating device respectively; and,
    a selection unit, which, when said monitoring unit outputs two or more alarm signals corresponding to two or more monitored items among said plurality of monitoring signals respectively, selects a monitoring signal with high order of priority from among the two or more alarm signals, based on a prescribed order of priority, and, when two or more among said plurality of monitoring signals received by said reception unit indicate abnormality, selects a monitoring signal with high order of priority from among the two or more monitoring signals indicating abnormality, based on said order of priority; or, when said monitoring unit outputs at least one alarm signal corresponding to at least one monitored item from among said plurality of monitored items, and moreover at least one among said plurality of monitoring signals received by said reception unit indicates abnormality, selects an alarm signal or monitoring signal with high order of priority from among at least one of said alarm signals and at least one of said monitoring signals, based on said order of priority.

4. The subscriber line terminal device according to claim 3, wherein said plurality of monitoring signals include a first signal, indicating normality or abnormality of a power supply of said subscriber line terminating device, a second signal, indicating normality or abnormality of a cable connecting said subscriber line terminating device with a user terminal, a third signal, indicating normality or abnormality of a state of reception of optical signals from said optical fiber by said subscriber line terminating device, and a fourth signal, indicating normality or device abnormality of said subscriber line terminating device;
    said alarm signals include a fifth signal, indicating a device malfunction of the subscriber line terminal device, and a sixth signal, indicating abnormality of said optical fiber; and,
    said order of priority stipulates the order of priority of said first and second signals, the order of priority of said first and third signals, the order of priority of said first and fourth signals, the order of priority of said first and sixth signals, the order of priority of said sixth and third signals, and the order of priority of said fifth and sixth signals.

5. The subscriber line terminal device according to claim 3, wherein said selection unit performs selection based on said order of priority when said monitoring unit outputs two or more alarm signals simultaneously or within a prescribed period of time, when two or more monitoring signals indicating said abnormality are received by said reception unit simultaneously or within said prescribed period of time, or, when said monitoring unit outputs at least one of said alarm signals, and moreover at least one of said monitoring signals indicating abnormality is received by said reception unit, simultaneously or within said prescribed period of time.

6. The subscriber line terminal device according to claim 3, wherein said plurality of monitoring signals are transmitted from said subscriber line terminating device, and received by said reception unit, by means of an Operation Administration and Maintenance (OAM) frame indicating a frame to send the control signal and monitoring signal.

* * * * *